(12) United States Patent
Cheriyadat et al.

(10) Patent No.: US 8,462,987 B2
(45) Date of Patent: Jun. 11, 2013

(54) DETECTING MULTIPLE MOVING OBJECTS IN CROWDED ENVIRONMENTS WITH COHERENT MOTION REGIONS

(75) Inventors: Anil M. Cheriyadat, Knoxville, TN (US); Richard J. Radke, Slingerlands, NY (US)

(73) Assignee: UT-Battelle, LLC, Oak Ridge, TN (US)

( * ) Notice: Subject to any disclaimer, the term of this patent is extended or adjusted under 35 U.S.C. 154(b) by 1023 days.

(21) Appl. No.: 12/489,589

(22) Filed: Jun. 23, 2009

(65) Prior Publication Data

US 2010/0322474 A1 Dec. 23, 2010

(51) Int. Cl.
*G06K 9/00* (2006.01)
(52) U.S. Cl.
USPC ........... 382/103; 382/107; 382/181; 382/190; 382/225; 348/169; 348/170; 348/171; 348/172
(58) Field of Classification Search
USPC ... 382/103, 181, 190, 225, 107; 348/169–172
See application file for complete search history.

(56) References Cited

U.S. PATENT DOCUMENTS

| | | | |
|---|---|---|---|
| 6,141,041 A | 10/2000 | Carlbom et al. | |
| 6,141,433 A | 10/2000 | Moed et al. | |
| 6,185,314 B1 | 2/2001 | Crabtree et al. | |
| 6,263,088 B1 | 7/2001 | Crabtree et al. | |
| 6,295,367 B1 * | 9/2001 | Crabtree et al. | 382/103 |
| 6,441,846 B1 | 8/2002 | Carlbom et al. | |
| 6,798,897 B1 | 9/2004 | Rosenberg | |
| 6,954,544 B2 | 10/2005 | Jepson et al. | |
| 7,358,498 B2 | 4/2008 | Geng et al. | |
| 7,426,301 B2 * | 9/2008 | Porikli | 382/181 |
| 7,493,243 B2 | 2/2009 | Choi et al. | |
| 7,613,321 B2 * | 11/2009 | Altherr et al. | 382/103 |
| 2003/0058111 A1 | 3/2003 | Lee et al. | |
| 2003/0219146 A1 | 11/2003 | Jepson et al. | |
| 2004/0141635 A1 | 7/2004 | Liang et al. | |
| 2005/0029458 A1 | 2/2005 | Geng et al. | |
| 2005/0196017 A1 * | 9/2005 | Altherr et al. | 382/103 |
| 2005/0249426 A1 | 11/2005 | Badawy | |
| 2006/0045354 A1 | 3/2006 | Hanna et al. | |
| 2006/0139347 A1 | 6/2006 | Choi et al. | |
| 2007/0014432 A1 | 1/2007 | Tsunashima | |
| 2007/0031004 A1 * | 2/2007 | Matsui et al. | 382/103 |
| 2007/0092110 A1 | 4/2007 | Xu et al. | |

(Continued)

OTHER PUBLICATIONS

Cheriyadat et al., "Detecting Multiple Moving Objects in Crowded Environments with Coherent Motion Regions", pp. 1-8.

(Continued)

*Primary Examiner* — Matthew Bella
*Assistant Examiner* — Julian Brooks
(74) *Attorney, Agent, or Firm* — Scully, Scott, Murphy & Presser, P.C.

(57) ABSTRACT

Coherent motion regions extend in time as well as space, enforcing consistency in detected objects over long time periods and making the algorithm robust to noisy or short point tracks. As a result of enforcing the constraint that selected coherent motion regions contain disjoint sets of tracks defined in a three-dimensional space including a time dimension. An algorithm operates directly on raw, unconditioned low-level feature point tracks, and minimizes a global measure of the coherent motion regions. At least one discrete moving object is identified in a time series of video images based on the trajectory similarity factors, which is a measure of a maximum distance between a pair of feature point tracks.

52 Claims, 6 Drawing Sheets

U.S. PATENT DOCUMENTS

| | | | |
|---|---|---|---|
| 2008/0111731 A1 | 5/2008 | Hubbard et al. | |
| 2008/0273752 A1* | 11/2008 | Zhu et al. | 382/103 |
| 2008/0317345 A1* | 12/2008 | Wiedemann et al. | 382/181 |
| 2009/0116732 A1 | 5/2009 | Zhou et al. | |
| 2009/0208111 A1* | 8/2009 | Jeong et al. | 382/190 |

OTHER PUBLICATIONS

Gok et al., "Moving Object Detection in Video by Detecting Non-Gaussian Regions in Subbands and Active Contours", Image Processing, Sep. 2003, vol. 3.

Johansson et al., "Spatio-Temporal Differentiation and Integration in Visual Motion Perception—An Experimental and Theoretical Analysis of Calculus-Like Functions in Visual Data Processing", Psychol. Res. 38, 1976, pp. 379-393.

Lam et al., "A fast active contour algorithm for object tracking in complex background".

Tu et al., "Crowd Segmentation Through Emergent Labeling", SMVP 2004, LNCS 3247, 2004, pp. 187-198.

Rittscher et al., "Simultaneous Estimation of Segmentation and Shape".

* cited by examiner

|  | $m^1$ | $m^2$ | $m^3$ | $m^4$ |
|---|---|---|---|---|
| $X^1$ | 1 | 0 | 0 | 0 |
| $X^2$ | 1 | 0 | 1 | 0 |
| $X^3$ | 0 | 1 | 0 | 1 |
| $X^4$ | 0 | 1 | 0 | 0 |
| $X^5$ | 1 | 0 | 0 | 0 |
| $X^6$ | 0 | 0 | 1 | 1 |
| $X^7$ | 1 | 0 | 1 | 0 |
| $X^8$ | 0 | 0 | 0 | 1 |

DETECTING MULTIPLE MOVING OBJECTS IN CROWDED ENVIRONMENTS WITH COHERENT MOTION REGIONS

STATEMENT REGARDING FEDERALLY SPONSORED RESEARCH OR DEVELOPMENT

This invention was made with United States government support under Prime Contract No. DE-AC05-00OR22725 awarded by the U.S. Department of Energy and Contract No. IIS-0237516 awarded by the U.S. National Science Foundation. The United States government has certain rights in this invention.

FIELD OF THE INVENTION

The present invention relates to the field of video image processing, and particularly to apparatus and methods for identifying a discrete moving object from a time series of video images.

BACKGROUND OF THE INVENTION

The inherent ability of our visual system to perceive coherent motion patterns in crowded environments is remarkable. For example, G. Johansson, "Visual motion perception," Scientific American, 14:76-78 (1975) describes experiments supporting this splendid visual perception capability. Such experiments demonstrate the innate ability of humans to distinguish activities and count independent motions simply from two-dimensional projections of a sparse set of feature points that are manually identified on human joints. When similar experiments were conducted with the video segments in which each feature points were reduced to a swarm of moving bright dots against a dark background, human observers were easily able to detect and classify the moving objects. While human eyes can perform such data extraction operations unconsciously, automated systems still face difficulty in detecting and counting independently moving objects based on feature point trajectories alone.

Previous approaches to detecting multiple moving objects, often humans in particular, include methods based on complex shape models, generative shape models based on low-level spatial features, bag-of-features, low-level motion pattern models, body-part assembly models, and low-level feature track clustering. P. Tu and J. Rittscher, "Crowd segmentation through emergent labeling," Proc. ECCV Workshop on Statistical Methods in Video Processing (2004) employs a different approach to crowd segmentation by arranging spatial features to form cliques. They posed the multi-object detection problem as one of finding a set of maximal cliques in a graph. The spatial features form the graph vertices, and each edge weight corresponds to the probability that features arise from the same individual. The spatial feature similarity measure was based on the assumption that the vertices lie on the circular contour of a human seen from above. J. Rittscher, P. Tu, and N. Krahnst, "Simultaneous estimation of segmentation and shape," Proc. of IEEE Conference on Computer Vision and Pattern Recognition, pp. 486-493 (2005) discloses a variant of the expectation-maximization algorithm for the estimation of shape parameters from image observations via hidden assignment vectors of features to cliques. The features are extracted from the bounding contours of foreground blob silhouettes, and each clique (representing an individual) is parameterized as a simple bounding box.

Despite the recent progress in automatically detecting coherent motion patterns in a video stream, however, the level of sensitivity and accuracy in the detection of motion patterns through a machine has not been able to consistently match the performance by human eyes. In view of this, a further improvement in consistent and accurate detection of such coherent motion patterns in a video stream is desired.

SUMMARY OF THE INVENTION

In the present invention, coherent motion regions may extend in time as well as space, enforcing consistency in detected objects over long time periods and making the algorithm robust to noisy or short point tracks. Coherent motion regions are selected to contain disjoint sets of tracks defined in a three-dimensional space including a time dimension. The algorithm of the present invention may operates directly on raw, unconditioned low-level feature point tracks, and minimizes a global measure of the coherent motion regions. At least one discrete moving object is identified in a time series of video images based on the trajectory similarity factors.

According to an aspect of the present invention, an apparatus for identifying at least one discrete moving object within a series of video images is provided. The apparatus includes:

an image recording device that stores a time series of video images; and an image analysis device that is configured to execute a program of machine-executable instructions to identify at least one discrete moving object in the time series of video images, wherein the program includes the steps of:

identifying a plurality of feature point tracks in the time series of video images, wherein for each video image of the time series of video images, all feature points belonging to a same feature point track are located within a polygon of a predefined size; and calculating a trajectory similarity factor for each pair of feature point tracks in each of the plurality of feature point tracks, wherein each trajectory similarity factor is a measure of a maximum distance between a pair of feature point tracks.

In one embodiment, the program further includes the step of generating at least one motion region from the plurality of feature point tracks, wherein each of the at least one motion region is a three-dimensional volume in a space formed by a two dimensional coordinate in the time series of video images and a time dimension, and each of the at least one motion region includes at least one of the plurality of feature point tracks.

In another embodiment, a trajectory similarity factor between an i-th feature point track and a j-th feature point track is given by the formula, $S(i,j)=\exp[-\alpha \times DQ(i,j) - \beta \times DVQ(i,j))]$, wherein $S(i,j)$ is the similarity factor between the i-th feature point track and the j-th feature point track, $\alpha$ and $\beta$ are positive constants, $DQ(i,j)$ is a quantity representing a first statistical quantity of a set of non-linear parameters derived from distances between the i-th feature point track and the j-th feature point track in the time series of video images, and $DVQ(i,j)$ is a second statistical quantity of the set of non-linear parameters for all combination of values for i and j.

In even another embodiment, the program further includes the step of generating a trajectory similarity matrix S, wherein the trajectory similarity matrix S is a Z×Z matrix and Z is a total number of feature point tracks in the time series of video images, and wherein each element $S_{ij}$ in an i-th row and a j-th column in the trajectory similarity matrix S is given by the $S(i,j)$ for all combinations of values for i and j.

In yet another embodiment, the program further includes the step of generating a Z×M matrix A, wherein Z is a total number of feature point tracks in the time series of video images, M is a total number of motion regions in the time series of video images, and an element of A in a k-th row and l-th column is set at 1 only if a k-th feature point track is present in an l-th motion region in at least one of the time series of video images, and is set at 0 if not, and, wherein each of the at least one motion region is a three-dimensional volume in a space formed by a two dimensional coordinate in the time series of video images and a time dimension, and each of the at least one motion region includes at least one of the plurality of feature point tracks.

In still another embodiment, the program further includes the step of calculating a coherency strength coefficient L(p) for all value of p, wherein p is an integer from 1 to M and the coherency strength coefficient L(p) is a measure of a likelihood that a p-th motion region represents movement of a single object.

In a further embodiment, the apparatus further includes a video camera configured to generate the time series of video images by continuously capturing video images in real time.

In an even further embodiment, the image analysis device includes a processor in a computer and the image recording device is embedded in the computer or externally connected to the computer.

According to another aspect of the present invention, a method for identifying at least one discrete moving object within a series of video images is provided. The method includes:

storing a time series of video images in an image recording device;

identifying a plurality of feature point tracks in the time series of video images, wherein for each video image of the time series of video images, all feature points belonging to a same feature point track are located within a polygon of a predefined size;

calculating a trajectory similarity factor for each pair of feature point tracks in each of the plurality of feature point tracks, wherein each trajectory similarity factor is a measure of a maximum distance between a pair of feature point tracks; and identifying at least one discrete moving object in the time series of video images based on the trajectory similarity factors.

In one embodiment, the method employs a processor in a computer for the image analysis device and an image recording device that is embedded in the computer or externally connected to the computer, and the identifying of the at least one discrete moving object is effected by executing a program of machine-executable instructions.

According to yet another aspect of the present invention, a machine-readable data storage device embodying a program of machine-executable instructions to identify at least one discrete moving object, wherein the program includes the steps of:

identifying a plurality of feature point tracks in the time series of video images, wherein for each video image of the time series of video images, all feature points belonging to a same feature point track are located within a polygon of a predefined size; and calculating a trajectory similarity factor for each pair of feature point tracks the plurality of feature point tracks, wherein each trajectory similarity factor is a measure of a maximum distance between a pair of feature point tracks; and identifying at least one discrete moving object in the time series of video images based on the trajectory similarity factors.

BRIEF DESCRIPTION OF THE DRAWINGS

It is noted that proportions of various elements in the accompanying figures are not drawn to scale to enable clear illustration of elements having smaller dimensions relative to other elements having larger dimensions.

DETAILED DESCRIPTION OF THE INVENTION

As stated above, the present invention relates to apparatus and methods for identifying a discrete moving object from a time series of video images. The present invention is now described in detail with accompanying figures. It is noted that like and corresponding elements mentioned herein and illustrated in the drawings are referred to by like reference numerals.

As used herein, "video images" refer to any type of data set in digital format that may be manipulated by a computing device.

As used herein, a "time series" refers to a group of at least two elements that are generated at different points in time.

As used herein, a "feature point" is a pixel located at a corner of an identifiable area and having a pixel intensity value has a non-zero horizontal gradient and a non-zero vertical gradient thereabout.

As used herein, a "feature point track" is a set of feature points that are identified to represent a same feature of a same object across multiple video images in a time series of video images.

Figure 1:
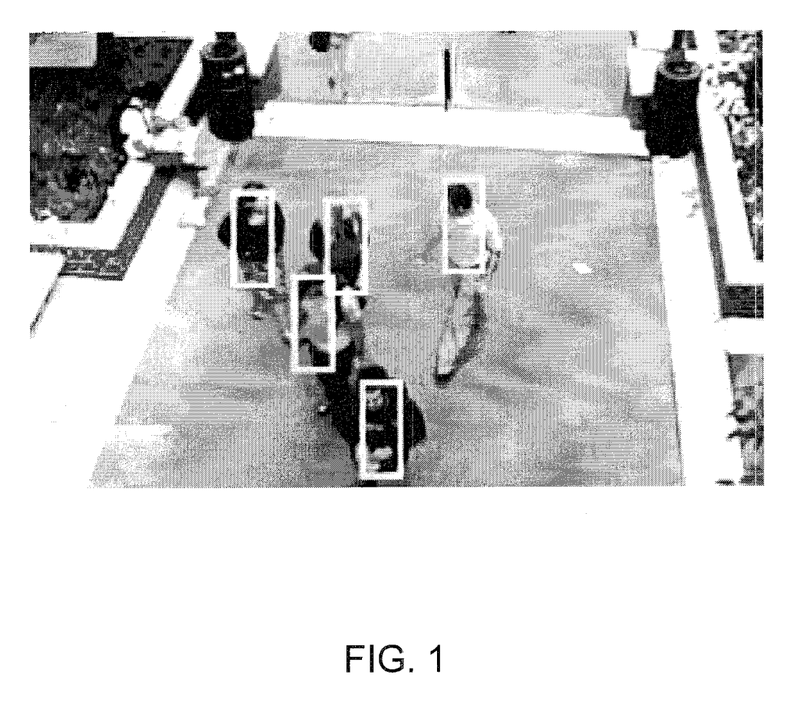
FIG. 1 is a sample of multi-object detection result obtained through the algorithm in one embodiment of the present invention.

Referring to FIG. 1, a sample of multi-object detection result obtained through application of the algorithm of the present invention is illustrated in a video image from a time series of video images. Five moving people are identified by rectangles, which represent coherent motion regions as determined by the method of the present invention.

Figure 2:
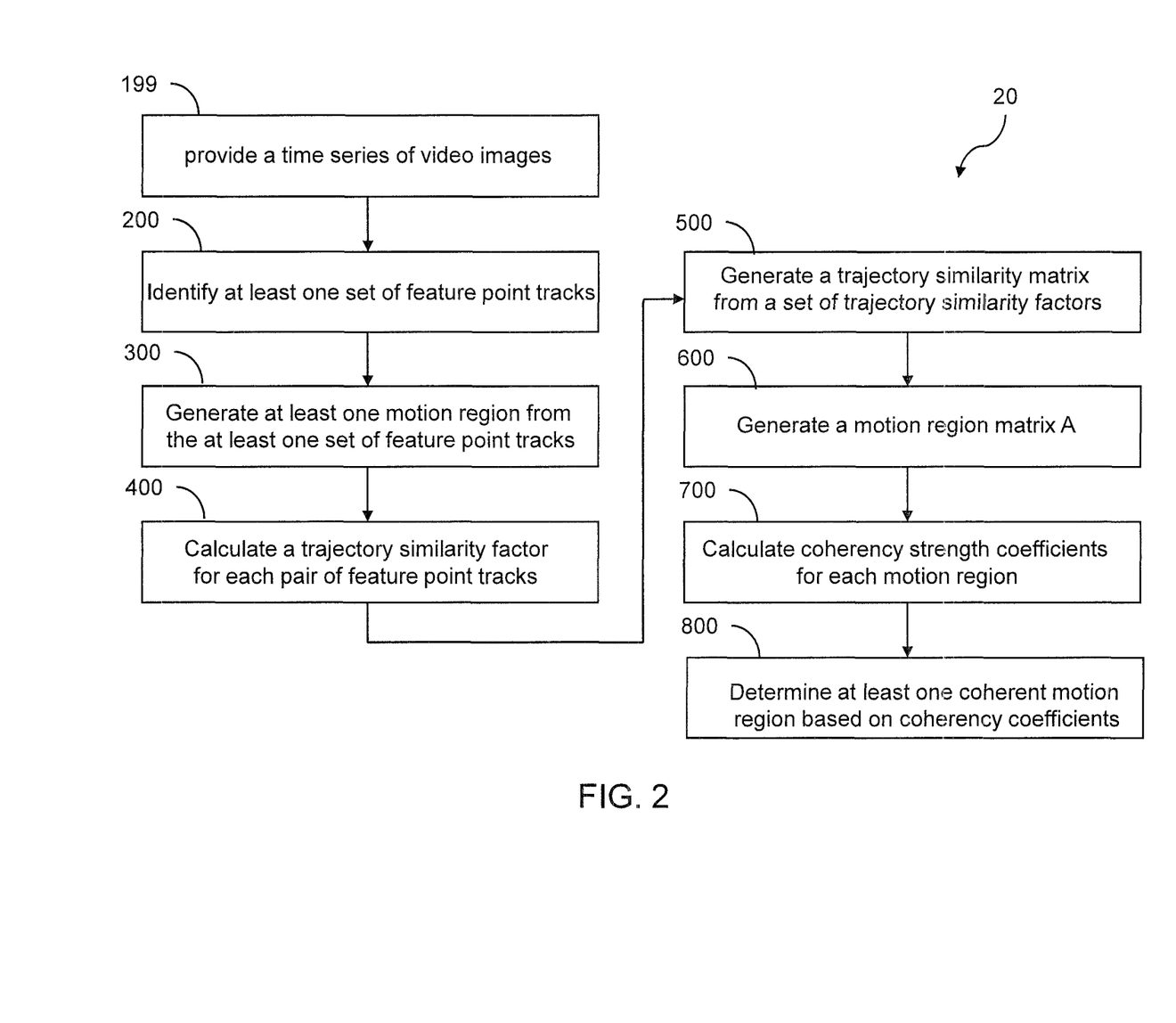
FIG. 2 is a flow chart for the method of identifying at least one discrete moving object according to one embodiment of the present invention.

Referring to FIG. 2, a flow chart 20 illustrates the method in one embodiment of the present invention, which can be implemented through an apparatus including an image analysis device that is configured to execute a program of machine-executable instructions. The program embedded in the apparatus may be employed to identify at least one moving object in the time series of video images. The program includes the steps corresponding to the various steps in the flow chart.

The apparatus may include an image source that provides a time series of video images. For example, the image source can be a video camera that is configured to generate a time series of video images by continuously capturing video images in real time. Alternately, the image source can be a data storage device that stores a time series of video images, which is provided to the image analysis device. The image analysis device can include a processor in a computer and said image recording device may be embedded in said computer or externally connected to the computer.

Referring to step 199 of the flow chart 20, the time series of video images is indexed, for example, with a video image index v having integer values from 1 to N, wherein N is the total number of video images in the time series. The video image index v uniquely identifies each video image in the time series of video images to be analyzed. Typically, the video image index v is the same as the temporal order of each video image in the time series. Thus, a video image generated at a later point in time has a greater video image index v than another video image generated at a previous point in time. Embodiments in which the order of the video image index v is reversed so that the time series of video images runs backward in time with an increasing video image index v are also contemplated herein.

Referring to step 200 of the flow chart 20, the time series of video images is analyzed to identify a plurality of feature point tracks. To effect the identification of the plurality of feature point tracks, each video image in the time series is analyzed to identify feature points. Methods of identifying feature points in video images are known in the art. Once all feature points are identified in the time series of video images, feature point tracks are identified, for example, employing an optical flow algorithm. In an optical flow algorithm, feature points are compared across multiple video images, for example, across pairs of video images or multiple sequential video images to identify sets of feature points having the similar pixel characteristics.

Each set of feature points having such similar pixel characteristics are classified as a feature point track. Each feature point in a feature point track is likely to represent the same feature of the same object but the correlation is not definite at this stage. The total number of feature point tracks identified in the time series of video images is herein referred to as an integer Z, which is an integer greater than 2. For each video image of the time series of video images, all feature points belonging to a same of feature point track are located within a polygon of a predefined size. In one embodiment, the size of the polygon may be provided as an external input. Specifically, at least one external input representing a dimension of the polygon may be provided to define the size of the polygon. In case the polygon is a rectangle, two parameters such as the width w and the height h of the rectangle may be provided as external inputs to the program that identifies the feature points. The size of the polygon, for example, may depend on the size of moving objects to be tracked, e.g., approximate size of a vehicle or a pedestrian on a road.

Referring to step 300 of the flow chart 20, at least one motion region is generated from the plurality of feature point tracks. Each of the at least one motion region is a three-dimensional volume in a space formed by a two dimensional coordinate in the time series of video images and an index in a time dimension, and each of the at least one motion region includes at least one feature point track. Each two dimensional coordinate may be in the form of $(x_i, y_i)$, wherein i includes multiple integers between, and including, 1 and N. Each of the time index may be in the from of the video image index v, or may be in the form of the actual time at which each video image is taken, or may be in any other form that may be sorted to correspond to the video image index v. Thus, a typical set of three-dimensional coordinates representing a motion region includes a set of $(x_i^s, y_i^s, t_i)$, in which the index i runs over the video image index v of all video images in which the motion region is present, the superscript s runs over all vertices of a polygon (for example, from 1 to 4 to correspond to the four corners of a rectangle in case the polygon is a rectangle), and $x_i^s$ represents the x coordinate of the s-th vertex of the polygon of the motion region in the video image with the video image index v of $t_i$, $y_i^s$ represents the y coordinate of the s-th vertex of the polygon of the motion region in the video image with the video image index v of $t_i$, and $t_i$ represents the value of the video image index v for the video image including $x_i^s$ and $y_i^s$.

Thus, each motion region is enclosed by a polygon of a predefined size that is determined by the external inputs to the program. The location of the polygon in a motion region may be different from video image to the next video image. Preferably, the size of the polygon remains the same across all video images.

Referring to step 400 of flow chart 20, a trajectory similarity factor is calculated for each pair of feature point tracks in the plurality of feature point tracks. Each trajectory similarity factor is a measure of a maximum distance between a pair of feature point tracks. Thus, for each pair of an i-th feature point track and a j-th feature point track in which each of i and j is an integer selected from the integers between, and including, 1 and N, a trajectory similarity factor $S(i,j)$ is calculated.

For example, a trajectory similarity factor between an i-th feature point track and a j-th feature point track may be given by the formula, $S(i,j)=\exp[-\alpha \times DQ(i,j) - \beta \times DVQ(i,j))]$. Here, $S(i,j)$ is the trajectory similarity factor between the i-th feature point track and the j-th feature point track and $\alpha$ and $\beta$ are positive constants. $DQ(i,j)$ is a quantity representing a first statistical quantity of a set of non-linear parameters derived from distances between the i-th feature point track and the j-th feature point track in the time series of video images. $DVQ(i,j)$ is a second statistical quantity of the set of non-linear parameters derived from distances between the i-th feature point track and the j-th feature point track in the time series of video images. The trajectory similarity factor $S(i,j)$ is calculated for all combination of values for i and j.

Preferably, the distances between the i-th feature point track and the j-th feature point track are measured distances between pixels of the i-th feature point track and the j-th feature point track in the time series of video images. Preferably, the first statistical quantity is a maximum, and the second statistical quantity is a standard deviation.

In one embodiment, the non-linear parameters may consists of a set of $D_t(i,j)$, which is given by:

$$D_t(i, j) = \sqrt{[d_t^x(i, j)]^2 + [d_t^y(i, j)]^2},$$

$$d_t^x(i, j) = (x_t^i - x_t^j)\left(1 + \max\left(0, \frac{|x_t^i - x_t^j| - w}{w}\right)\right), \text{ and}$$

$$d_t^y(i, j) = (y_t^i - y_t^j)\left(1 + \max\left(0, \frac{|y_t^i - y_t^j| - h}{h}\right)\right),$$

wherein t is an index selected from a set of indices that encompass all video images that include the i-th feature point track and the j-th feature point track in the time series of video images, i.e., in all video images in which feature points belonging to the i-th feature point track and the j-th feature point track may be found in the time series of video images; $x_t^i$ is an x-coordinate of a point in the i-th feature point track within a video image having an index of t;

$x_t^j$ is an x-coordinate of a point in the j-th feature point track within a video image having an index of t;
$y_t^i$ is a y-coordinate of a point in the i-th feature point track within a video image having an index of t;
$y_t^j$ is a y-coordinate of a point in the j-th feature point track within a video image having an index of t;
w is a dimension of the polygon along an x-direction in the video image having an index of t; and h is a dimension of the polygon along a y-direction in the video image having an index of t.

The parameter $d_t^x(i,j)$ is a non-linear parameter of $x_t^i$ and $x_t^j$ because when the absolute value of the difference between $x_t^i$ and $x_t^j$ exceeds w, $d_t^x(i,j)$ becomes a quadratic function of $x_t^i - x_t^j$. Likewise, the parameter $d_t^y(i,j)$ is a non-linear parameter of $y_t^i$ and $y_t^j$ because when the absolute value of the difference between $y_t^i$ and $y_t^j$ exceeds h, $d_t^y(i,j)$ becomes a quadratic function of $y_t^i - y_t^j$.

In case the polygon is a rectangle, the w may be a width of the rectangle, and the h may be a height of the rectangle. As discussed above, the parameters w and h may be provided as external inputs before identifying the at least one motion region.

Referring to step 500 of the flow chart 20, upon obtaining the values for trajectory similarity factor S(i,j) for each pair of the i-th feature point track and the j-th feature point track, a trajectory similarity matrix S, which is a Z×Z matrix is formed from the collection of all trajectory similarity factors S(i,j). Each element $S_{ij}$ in the i-th row and the j-th column in the trajectory similarity matrix S is given by the S(i,j) for all combinations of values for i and j.

At least one motion regions is defined by comparing each value of the trajectory similarity factor S(i,j) with a predetermined threshold value. For each of the at least one coherent motion region, each pair of an i-th feature point track and a j-th feature point track therein has a trajectory similarity factor S(i,j) that exceeds the predetermined threshold value. Each trajectory similarity factor between a pair of a feature point track in a coherent motion region and another feature point track not belonging to the coherent motion region has a value that does not exceed the predetermined threshold value. A feature point track may belong to multiple motion regions. If a feature point track does not correlate with any other feature point track to provide a trajectory similarity factor that exceeds the predetermined threshold value, that feature point track belongs to a motion region of its own. Otherwise, a feature point track is included in at least one motion region, each including at least two feature point tracks.

Referring to step 600 of the flow chart 20, a motion region matrix A is generated. The motion region matrix A is a Z×M matrix A, wherein Z is the total number of feature point tracks in the time series of video images as discussed above and M is a total number of motion regions in the time series of video images. The element of A in the k-th row and the l-th column is set at 1 only if the k-th feature point track is present in the l-th motion region in at least one of the time series of video images. The element of A in the k-th row and the l-th column is set at 0 unless the k-th feature point track is present in the l-th motion region in at least one of the time series of video images.

Figure 3:
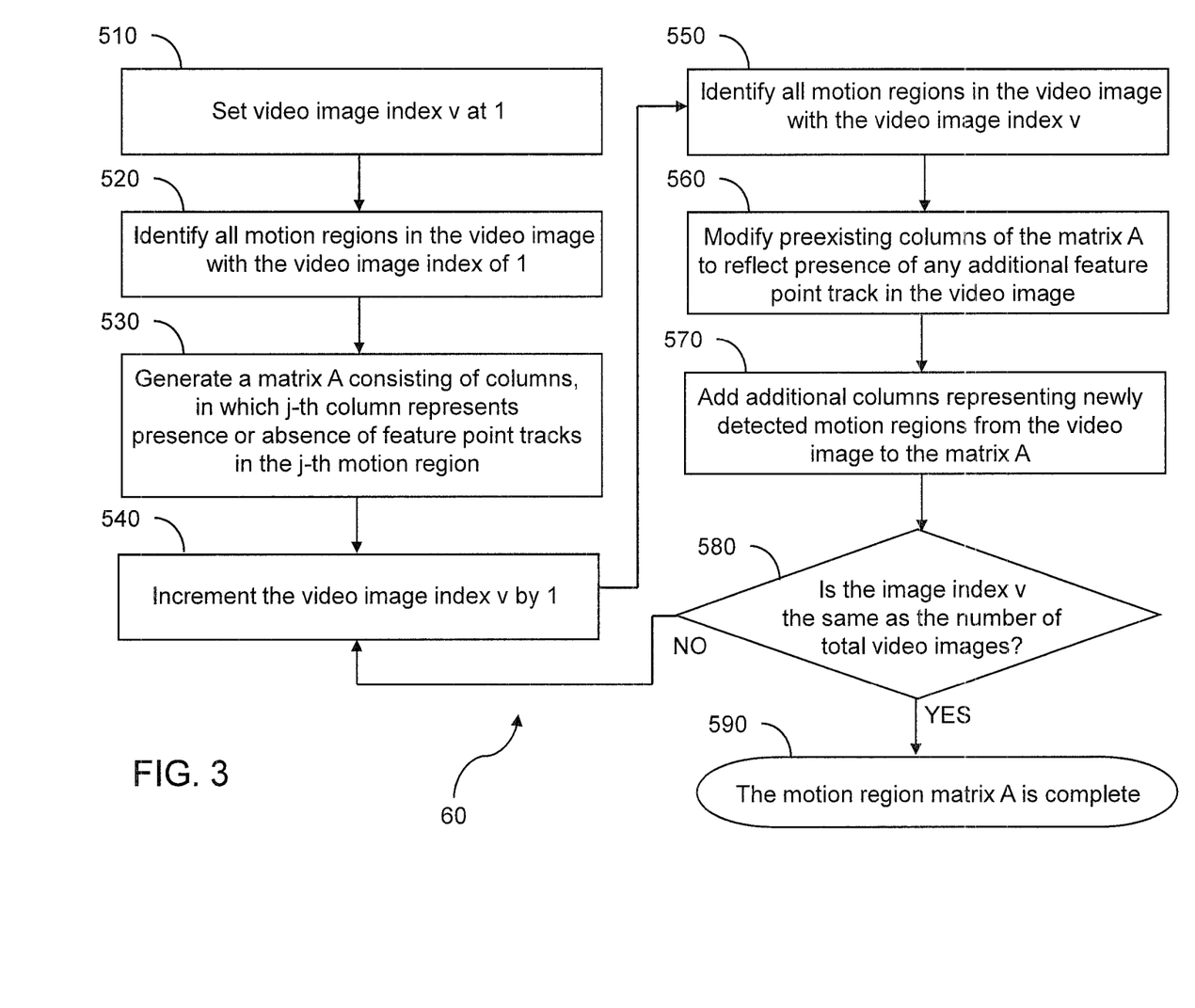
FIG. 3 is a flow chart for the method of building a Z×M matrix S according to one embodiment of the present invention.
Figure 4A:
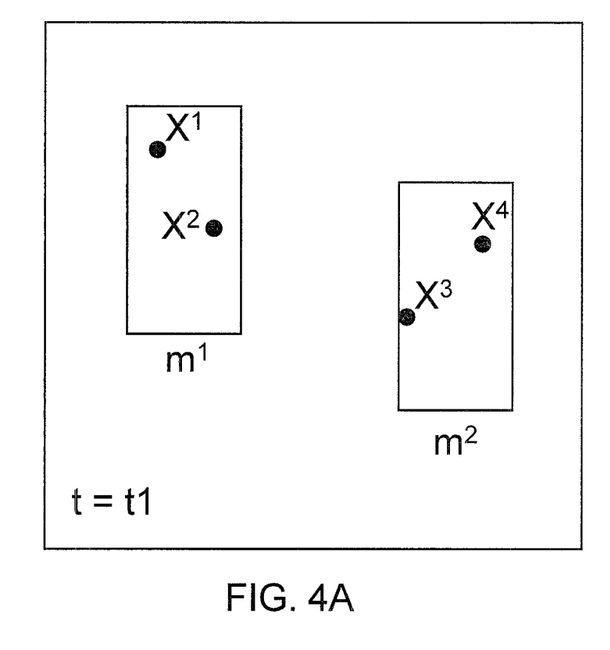
FIGS. 4A, 4B, and 4C are illustration of motion regions $m^1$, $m^2$, $m^3$, and $m^4$ for a given set of feature point tracks $X^1$, $X^2$, $X^3$, $X^4$, $X^5$, $X^6$, $X^7$, and $X^8$ in a time series of video images with time indices t1, t2, and t3.

Referring to FIG. 3, a flow chart 60 illustrates steps for building the motion region matrix S according to an embodiment of the present invention. A method of forming the motion region matrix is illustrated employing FIGS. 4A, 4B, and 4C, which schematically represent the feature point tracks $X^1$, $X^2$, $X^3$, $X^4$, $X^5$, $X^6$, $X^7$, and $X^8$ in three exemplary video images having time indices t1, t2, and t3 and constituting a time series of video images. t1, t2, and t3 are sequential, i.e., t2 is later than t1, and t3 is later than t2. Four motion regions $m^1$, $m^2$, $m^3$, and $m^4$ are identified in the three exemplary video images in FIGS. 4A, 4B, and 4C. FIG. 5 illustrates an exemplary motion region matrix A that is built after analyzing the three video images represented by FIGS. 4A, 4B, and 4C.

Referring to step 510 in flow chart 60, the video image index v is set at the initial value, i.e., at 1. In the case of the time series of video images represented by FIGS. 4A, 4B, and 4C, setting the video image index v at 1 is equivalent to selecting the video image in FIG. 4A.

Referring to step 520 in flow chart 60, the video image with the video image index v is analyzed to identify all motion regions therein. Referring to FIG. 4A as an example, a first motion region $m^1$ is identified which includes feature points that belong to the first feature point track $X^1$ and the second feature point track $X^2$. A second motion region $m^2$ is identified which includes feature points that belong to a third feature point track $X^3$ and a fourth feature point track $X^4$.

Referring to step 530 in flow chart 60, a motion region matrix A having columns, in which j-th column represents presence or absence of feature point tracks in the j-th motion region. The motion region matrix A at the stage of generation is herein referred to as an initial motion region matrix $A_0$. The initial motion region matrix $A_0$ is a Z×$m_0$ matrix. The number $m_0$ corresponds to the number of the detected motion regions in the video image with the video index value v of 1. The Z×$m_0$ matrix $A_0$ is formed by juxtaposing m numbers of column vectors, each having Z elements. The elements of each column vector represent presence or absence of each feature point track in the time series of video images in each of the detected motion regions. The element of each column vector at the row corresponding to a feature point track is set at 1 if that feature point track is present in the detected motion regions corresponding to the column vector. The element of each column vector at the row corresponding to a feature point track is set at 0 if that feature point track is absent in the detected motion regions corresponding to the column vector.

Referring to FIG. 4A as an example, the total number of the feature point tracks is 8, i.e., Z=8, and the total number of detected motion regions is 2, i.e., $m_0$=2. The first feature point track V and the second feature point track $X^2$ are present in the first motion region $m^1$, while all other feature point tracks are absent therein. The third feature point track $X^3$ and the fourth feature point track $X^4$ are present in the second motion region $m^2$, while all other feature point tracks are absent therein. Thus, the first column vector corresponding to the first motion region $m^1$ is $(1, 1, 0, 0, 0, 0, 0, 0)^T$, wherein T represents a transpose. The second column vector corresponding to the second motion region $m^2$ is $(0, 0, 1, 1, 0, 0, 0, 0)^T$. Thus, the Z×$m_0$ matrix $A_0$ in this case is:

$$\begin{bmatrix} 1 & 0 \\ 1 & 0 \\ 0 & 1 \\ 0 & 1 \\ 0 & 0 \\ 0 & 0 \\ 0 & 0 \\ 0 & 0 \end{bmatrix}$$

Referring to step 540 in flow chart 60, the video image index v is incremented by 1, i.e., becomes 2 at this step. In the case of the time series of video images represented by FIGS.

Figure 4B:
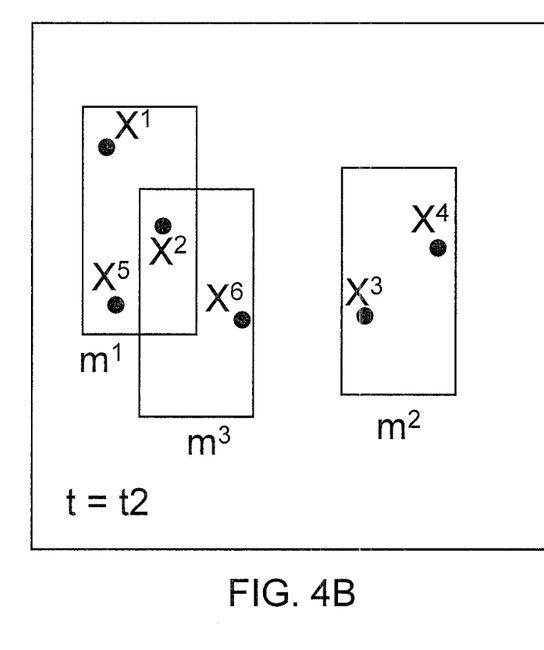
Figure 4C:
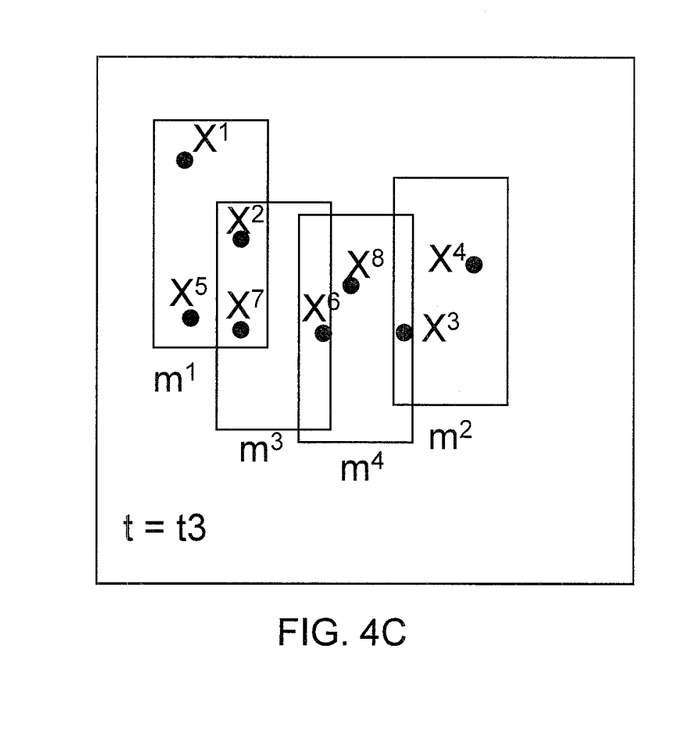
Figure 5:
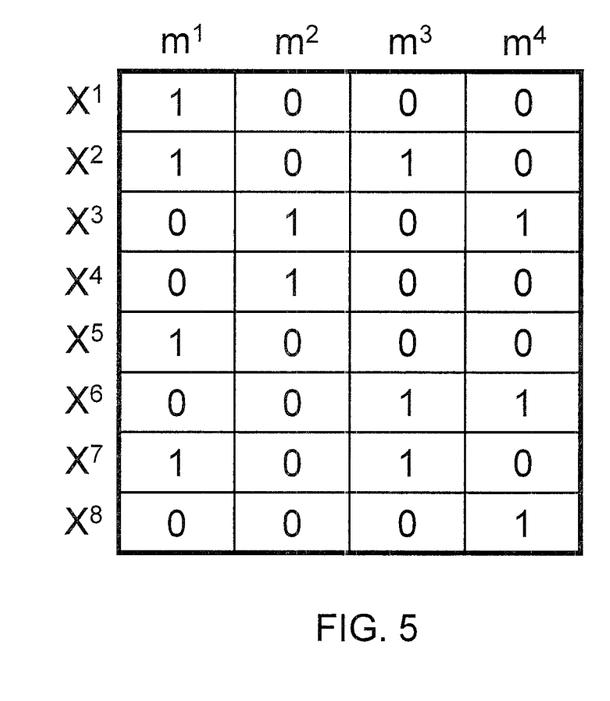
FIG. 5 is an illustration of a matrix A after the time instant t=t3.

4A, 4B, and 4C, incrementing the video image index v to 2 is equivalent to selecting the video image in FIG. 4B.

Referring to step 550 in flow chart 60, all motion regions in the video image with the video image index v, which is now at 2, are identified. Referring to FIG. 4B as an example, the first motion region $m^1$ is identified which includes feature points that belong to the first feature point track $X^1$, the second feature point track $X^2$, and the fifth feature point track $X^5$. The second motion region $m^2$ is identified which includes feature points that belong to the third feature point track $X^3$ and the fourth feature point track $X^4$. In addition, a third motion region $m^3$ is identified which includes feature points that belong to the second feature point track $X^2$ and a sixth feature point track $X^6$.

Referring to step 560 in flow chart 60, preexisting columns of the motion region matrix A are modified to reflect presence of any additional feature point track in the video image under analysis. In other words, at least one preexisting column of the motion region matrix A, which is the same as the initial motion region matrix $A_0$ at this point, is modified to reflect detection of any additional feature point track in one of previously detected motion regions corresponding to the at least one preexisting column. In general, if the motion region matrix A at any stage is represented by a Z×m matrix A', wherein m is a positive integer, the motion region matrix A' is modified to reflect the detection of additional feature point tracks in the motion regions which is represented by existing columns in the Z×m matrix A'.

Referring to FIG. 4B as an example, detection of any additional feature point track in one of previously detected motion regions corresponding to the at least one preexisting column applies to the newly detected fifth feature point track $X^5$ within the previously detected first motion region $m^1$. The second motion region $m^2$ does not include any additional feature point track that is newly detected. Thus, the only modification to the Z×m matrix A' is the modification of the element representing the fifth feature point track $X^5$ within the column representing the first motion region $m^1$. To reflect the presence of the fifth feature point track $X^5$ within first motion region $m^1$, the fifth element of the column representing the first motion region $m^1$ is changed to 1. Thus, the Z×m matrix A' after modification is:

$$\begin{bmatrix} 1 & 0 \\ 1 & 0 \\ 0 & 1 \\ 0 & 1 \\ 1 & 0 \\ 0 & 0 \\ 0 & 0 \\ 0 & 0 \end{bmatrix}$$

Referring to step 570 of the flow chart 60, the video image with the video image index of v is analyzed to determine whether a previously undetected motion region is present or not in that video image. If a previously undetected motion region is detected, additional columns each representing the newly detected motion regions from the video image are added to the Z×m matrix A'. In other words, a column vector representing the presence of each feature point track in the video image in the time series is added to form a Z×(m+1) matrix A" for each previously undetected, and newly detected, motion region. In general, m is a positive integer less than M and the Z×m matrix A' has m columns representing presence of each feature point track in the time series of video images in each of previously detected motion regions.

Referring to FIG. 4B as an example, a third motion region $m^3$ is a previously undetected, and newly detected, motion region. The third motion region $m^3$ includes the second feature point track $X^2$ and a sixth feature point track $X^6$. The column vector representing the third motion region $m^3$ is given by $(0, 1, 0, 0, 0, 1, 0, 0)^T$. The 8×2 matrix A' after modification becomes an 8×3 matrix A", which is given by the juxtaposition of the 8×2 matrix A' and the column vector representing the third motion region $m^3$, i.e., $$\begin{bmatrix} 1 & 0 & 0 \\ 1 & 0 & 1 \\ 0 & 1 & 0 \\ 0 & 1 & 0 \\ 1 & 0 & 0 \\ 0 & 0 & 1 \\ 0 & 0 & 0 \\ 0 & 0 & 0 \end{bmatrix}$$

Referring to step 580 in flow chart 60, a decision is made as to whether the video image index v is the same as the number of total video images. The purpose of this step is to find out whether the video image analyzed immediately before is the last image of the time series. If the video image analyzed immediately before is the last image of the time series, the video image index v is the same as the total number of video images N. In this case, the flow chart 60 comes to the end step 590, at which it is determined that the motion region matrix A in the present form is a complete form. If the video image index v is not the same as the total number of video images N, the flow chart 60 proceeds to step 540 again to increment the video image index v by one, and to continue to analyze the next video image through the steps 550, 560, and 570 and to come to another decision step at step 580 again. This process continues until the analysis of all video images in the time series is complete and the process flow comes to step 590.

Referring to the example of FIGS. 4A, 4B, and 4C, N is 3 and video image index v is 2 at this point. Thus, the video image index v is not the same as the total number of video images N, and the flow chart 60 proceeds to step 540 again and the video image index v is incremented to 3.

Step 550 is then executed again. In this case, the image represented by FIG. 4C is analyzed for motion pictures so that the first motion region $m^1$, the second motion region $m^2$, the third motion region $m^3$, and the fourth motion region $m^4$ are detected.

Referring to step 560 again, a previously undetected seventh feature point track $X^7$ is detected in the first motion region $m^1$. Further, the seventh feature point track $X^7$, which is previously undetected in the third motion region $m^3$, is also newly detected in the third motion region $m^3$. Therefore, the 8×3 matrix A' is modified to reflect the detection of the seventh feature point track $X^7$ within the first and third motion regions $m^1$ and $m^3$, which did not include the seventh feature point track $X^7$ prior to the analysis of the video image represented by FIG. 4C. The modified 8×3 matrix A' thus becomes:

$$\begin{bmatrix} 1 & 0 & 0 \\ 1 & 0 & 1 \\ 0 & 1 & 0 \\ 0 & 1 & 0 \\ 1 & 0 & 0 \\ 0 & 0 & 1 \\ 1 & 0 & 1 \\ 0 & 0 & 0 \end{bmatrix}$$

Thereafter, the process flow proceeds to step 570. A fourth motion region $m^4$ including the third feature point track $X^3$, the sixth feature point track $X^6$, and an eighth feature point track $X^8$ is detected. The column vector representing the fourth motion region $m^4$ is thus given by $(0, 0, 1, 0, 0, 1, 0, 1)^T$. The 8×3 matrix A' after modification becomes an 8×4 matrix A", which is given by the juxtaposition of the 8×3 matrix A' and the column vector representing the fourth motion region $m^4$, i.e., $$\begin{bmatrix} 1 & 0 & 0 & 0 \\ 1 & 0 & 1 & 0 \\ 0 & 1 & 0 & 1 \\ 0 & 1 & 0 & 0 \\ 1 & 0 & 0 & 0 \\ 0 & 0 & 1 & 1 \\ 1 & 0 & 1 & 0 \\ 0 & 0 & 0 & 1 \end{bmatrix}$$

When the process flow comes to step 580 again, the video image index v is at 3, which is equal to the total number of video images in the exemplary time series. Thus, repetition of the steps 550, 560, and 570 continues until all video images in the time series of video images are examined. The (m+1) becomes equal to M, i.e., the total number of motion regions, upon the last execution of the adding of column vectors at step 570 during the examining of the time series. Once the motion matrix A is finalized, the motion matrix A includes elements that are identical to the elements listed in FIG. 4. At this stage, the step 600 in flow chart 20 is complete.

Referring to step 700 in flow chart 20, coherency strength coefficients L(p) are calculated for each motion region for all integers p between, and including, 1 and M. The coherency strength coefficient L(p) is a measure of a likelihood, i.e., a numerically assigned probability, that the p-th motion region represents movement of a single object.

In a preferred embodiment, the coherency strength coefficient L(p) is given by $L(p)=A^T(p)SA(p)$, wherein A(p) is a column vector that is identical to the p-th column of the Z×M matrix A, S is the trajectory similarity matrix, and $A^T(p)$ is the p-th row of a transpose of the Z×M matrix A. Thus, each L(p) is a scalar.

Referring to step 800 in flow chart 20, determination is made as to whether each of the coherency strength coefficient L(p) exceeds a minimum value. A set of at least one coherent motion region is generated such that each of the at least one coherent motion region has a coherency strength coefficient L(p) that exceeds the minimum value. Each motion region that do not belong to the set of at least one coherent motion region has a coherency strength coefficient that does not exceed the minimum value. In other words, the value of each coherency strength coefficient L(p) relative to the minimum value determines whether each p-th motion region $m^p$ belongs to the set of the at least one coherent motion region.

Each of the at least one coherent motion region has an enhanced likelihood of being a discrete moving object that is not part of any other moving object, i.e., is likely to be an independently moving object. The at least one discrete moving object in the time series of video images is thus determined based on the trajectory similarity factors and quantities derived therefrom including the values for the coherency strength coefficients L(p). The confidence level in the identification of the at least one discrete moving object in the time series of video images is determined based on the minimum value for the coherency strength coefficients L(p), which is employed as the threshold value for identification of the at least one coherent motion region. Thus, the present invention provides methods and apparatus for identifying a set of discrete moving objects, i.e., a set of independently moving objects, from a time series of video images.

Figure 6:
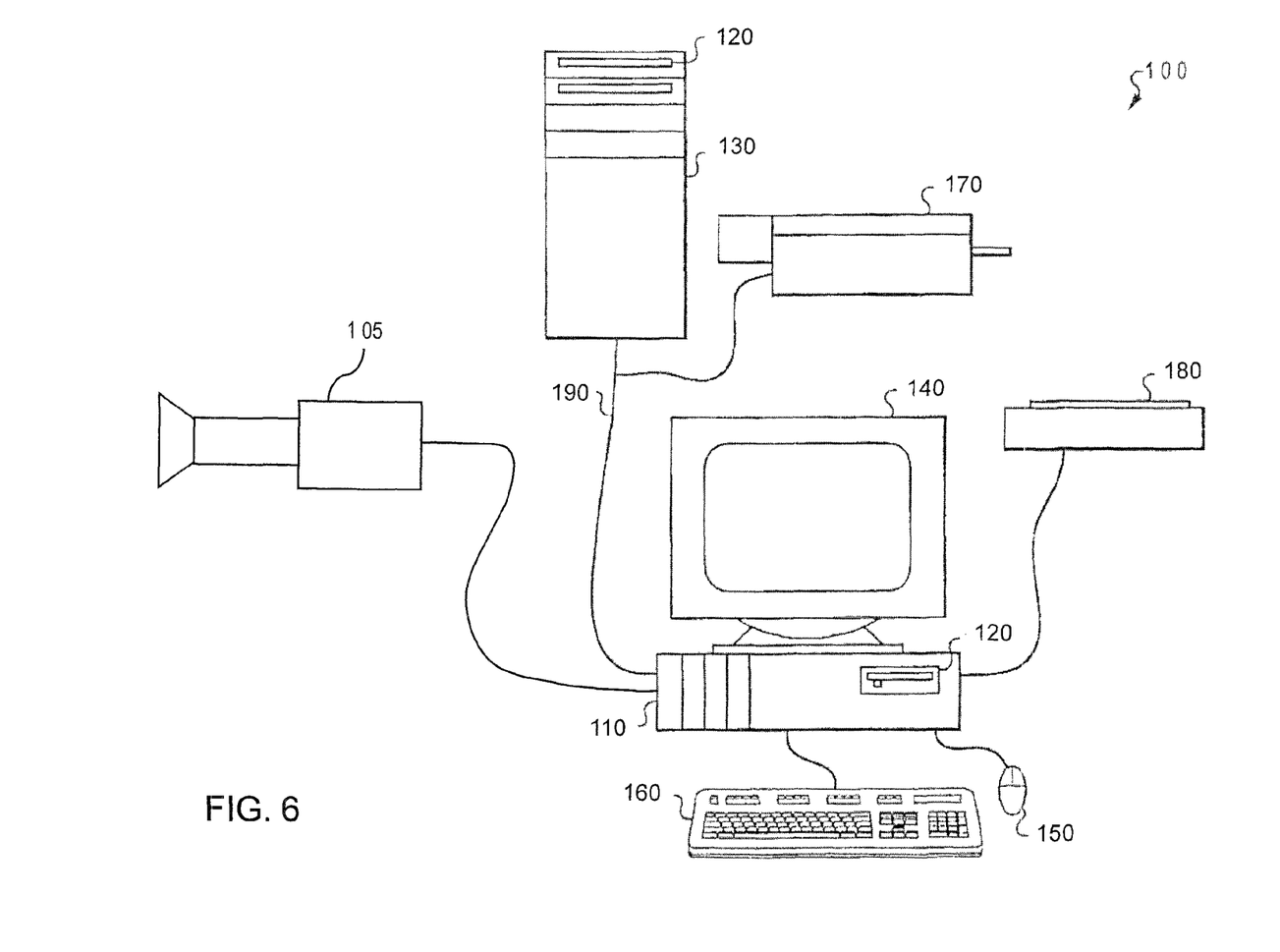
FIG. 6 is an exemplary apparatus according to one embodiment of the present invention.

Referring to FIG. 6, an exemplary apparatus 100 according to the present invention is shown. The exemplary apparatus 100 is a computer-based system in which a method embodiment of the invention may be carried out. The computer-based system includes a processing unit 110, which houses a processor, memory and other systems components (not shown expressly in the drawing) that implement a general purpose processing system, or computer that may execute a computer program product. The computer program product may comprise media, for example a compact storage medium such as a compact disc, which may be read by the processing unit 110 through a disc drive 120, or by any means known to the skilled artisan for providing the computer program product to the general purpose processing system for execution thereby.

The exemplary apparatus 100 includes a video camera 105 that provide a time series of video images in real time to the processing unit 100. Alternately, the time series of video images may be stored in the processing unit 110 or a serve 130 and retrieved during execution of a program by the processing unit.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 110, as mentioned, or may be located on a remote system such as a server 130, coupled to processing unit 110, via a network interface such as an Ethernet interface. Monitor 140, mouse 150 and keyboard 160 are coupled to the processing unit 110, to provide user interaction. Scanner 180 and printer 170 are provided for document input and output. Printer 170 is shown coupled to the processing unit 110 via a network connection, but may be coupled directly to the processing unit 110. Scanner 180 is shown coupled to the processing unit 110 directly, but it should be understood that peripherals might be network coupled, or direct coupled without affecting the ability of the processing unit 110 to perform the method of the invention.

While the invention has been described in terms of specific embodiments, it is evident in view of the foregoing description that numerous alternatives, modifications and variations will be apparent to those skilled in the art. Other suitable modifications and adaptations of a variety of conditions and parameters normally encountered in video signal processing, obvious to those skilled in the art, are within the scope of this invention. All publications, patents, and patent applications cited herein are incorporated by reference in their entirety for all purposes to the same extent as if each individual publication, patent, or patent application were specifically and individually indicated to be so incorporated by reference. Accordingly, the invention is intended to encompass all such alternatives, modifications and variations which fall within the scope and spirit of the invention and the following claims.

What is claimed is:

1. An apparatus for identifying at least one discrete moving object within a series of video images, said apparatus comprising:
    an image recording device that stores a time series of video images; and
    an image analysis device that is configured to execute a program of machine-executable instructions to identify at least one moving object in said time series of video images, wherein said program includes the steps of:
    identifying a plurality of feature point tracks in said time series of video images, wherein for each video image of said time series of video images, all feature points belonging to a same feature point track are located within a polygon of a predefined size;
    calculating a trajectory similarity factor for each pair of feature point tracks said plurality of feature point tracks, wherein each trajectory similarity factor is a measure of a maximum distance between a pair of feature point tracks; and
    generating a trajectory similarity matrix S, wherein said trajectory similarity matrix S is a Z×Z matrix and Z is a total number of feature point tracks in said time series of video images, and wherein each element $S_{ij}$ in an i-th row and a j-th column in said trajectory similarity matrix S is given by S(i,j) that represents a trajectory similarity factor between an i-th feature point track and a j-th feature point track for all combinations of values for i and j.

2. The apparatus of claim 1, wherein said program further includes the step of generating at least one motion region from said plurality of feature point tracks, wherein each of said at least one motion region is a three-dimensional volume in a space formed by a two dimensional coordinate in said time series of video images and an index in a time dimension, and each of said at least one motion region includes at least one of said plurality of feature point tracks.

3. The apparatus of claim 2, wherein said program further includes the step of generating at least one coherent motion region from each of said at least one motion region, wherein each pair of feature point tracks in each of said at least one coherent motion region has a trajectory similarity factor that exceeds a predetermined threshold value.

4. The apparatus of claim 3, wherein each trajectory similarity factor between a pair of a feature point track in a coherent motion region and another feature point track not belonging to said coherent motion region has a value that does not exceed said predetermined threshold value.

5. The apparatus of claim 1, wherein said S(i,j) is given by the formula, $S(i,j)=\exp[-\alpha \times DQ(i,j) - \beta \times DVQ(i,j)]$, wherein $\alpha$ and $\beta$ are positive constants, DQ(i,j) is a quantity representing a first statistical quantity of a set of non-linear parameters derived from distances between said i-th feature point track and j-th feature point track in said time series of video images, and DVQ(i,j) is a second statistical quantity of said set of non-linear parameters for all combination of values for i and j.

6. The apparatus of claim 1, wherein said program further includes the step of generating a Z×M matrix A, wherein Z is a total number of feature point tracks in said time series of video images, M is a total number of motion regions in said time series of video images, and an element of A in a k-th row and an l-th column is set at 1 only if a k-th feature point track is present in an l-th motion region in at least one of said time series of video images, and is set at 0 if not, and, wherein each of said at least one motion region is a three-dimensional volume in a space formed by a two dimensional coordinate in said time series of video images and a time dimension, and each of said at least one motion region includes at least one of said plurality of feature point tracks.

7. The apparatus of claim 6, wherein said program further includes the steps of:
    detecting whether a previously undetected motion region is present in each of said time series of video images; and
    if a previously undetected motion region is detected, adding to a Z×m matrix A' a column vector representing presence or absence of each feature point track in said time series of video images to form a Z×(m+1) matrix A", wherein m is a positive integer less than M and said Z×m matrix A' has m columns representing presence or absence of each feature point track in said time series of video images in each of previously detected motion regions.

8. The apparatus of claim 7, wherein said program further include the step of modifying at least one preexisting column of said Z×m matrix A' to reflect detection of an additional feature point track in one of previously detected motion regions corresponding to said at least one preexisting column.

9. The apparatus of claim 7, wherein said program further includes the step of repeating said steps of detecting and adding until all video images in said time series of video images are examined, wherein said (m+1) becomes equal to M upon a last execution of said adding step during said examining 10. The apparatus of claim 6, wherein said program further includes the step of calculating a coherency strength coefficient L(p) for all value of p, wherein p is an integer from 1 to M and said coherency strength coefficient L(p) is a measure of a likelihood that a p-th motion region represents movement of a single object.

11. The apparatus of claim 10, wherein said coherency strength coefficient L(p) is given by $L(p)=A^T(p)SA(p)$, wherein A(p) is a column vector that is identical to a p-th column of said Z×M matrix A, S is said trajectory similarity matrix, and $A^T(p)$ is a p-th row of a transpose of said Z×M matrix A.

12. The apparatus of claim 10, wherein said program further includes the step of determining whether each of said coherency strength coefficient L(p) exceeds a minimum value.

13. The apparatus of claim 12, wherein said program further includes the step of generating a set of at least one coherent motion region, wherein each of said at least one coherent motion region has a coherency strength coefficient that exceeds said minimum value, and each motion region that does not belong to said set of at least one coherent motion region has a coherency strength coefficient that does not exceed said minimum value.

14. The apparatus of claim 1, further comprising a video camera configured to generate said time series of video images by continuously capturing video images in real time.

15. The apparatus of claim 1, wherein said image analysis device includes a processor in a computer and said image recording device is embedded in said computer or externally connected to said computer.

16. An apparatus for identifying at least one discrete moving object within a series of video images, said apparatus comprising:
  an image recording device that stores a time series of video images; and
  an image analysis device that is configured to execute a program of machine-executable instructions to identify at least one moving object in said time series of video images, wherein said program includes the steps of:
  identifying a plurality of feature point tracks in said time series of video images, wherein for each video image of said time series of video images, all feature points belonging to a same feature point track are located within a polygon of a predefined size;
  calculating a trajectory similarity factor for each pair of feature point tracks said plurality of feature point tracks, wherein each trajectory similarity factor is a measure of a maximum distance between a pair of feature point tracks,
  wherein a trajectory similarity factor between an i-th feature point track and a j-th feature point track is given by the formula, $S(i,j)=\exp[-\alpha \times DQ(i,j)-\beta \times DVQ(i,j))]$, wherein $S(i,j)$ is said trajectory similarity factor between said i-th feature point track and said j-th feature point track, $\alpha$ and $\beta$ are positive constants, $DQ(i,j)$ is a quantity representing a first statistical quantity of a set of non-linear parameters derived from distances between said i-th feature point track and said j-th feature point track in said time series of video images, and $DVQ(i,j)$ is a second statistical quantity of said set of non-linear parameters for all combination of values for i and j.

17. The apparatus of claim 16, wherein said distances are measured distances between pixels of said i-th feature point track and said j-th feature point track in said time series of video images, wherein said first statistical quantity is a maximum, and wherein said second statistical quantity is a standard deviation.

18. The apparatus of claim 17, wherein said non-linear parameters consists of a set of $D_t(i,j)$, wherein $D_t(i,j)=\sqrt{[d_t^x(i,j)]^2+[d_t^y(i,j)]^2}$, $$d_t^x(i,j) = (x_t^i - x_t^j)\left(1 + \max\left(0, \frac{|x_t^i - x_t^j| - w}{w}\right)\right), \text{ and}$$

$$d_t^y(i,j) = (y_t^i - y_t^j)\left(1 + \max\left(0, \frac{|y_t^i - y_t^j| - h}{h}\right)\right),$$

and wherein t is an index selected from a set of indices that encompass all video images that include said i-th feature point track and said j-th feature point track in said time series of video images, $x_t^i$ is an x-coordinate of a point in said i-th feature point track within a video image having an index of t, $x_t^j$ is an x-coordinate of a point in said j-th feature point track within a video image having an index of t, $y_t^i$ is a y-coordinate of a point in said i-th feature point track within a video image having an index of t, $y_t^j$ is a y-coordinate of a point in said j-th feature point track within a video image having an index of t, w is a dimension of said polygon along an x-direction in said video image having an index of t, and h is a dimension of said polygon along a y-direction in said video image having an index of t.

19. The apparatus of claim 18, wherein said polygon is a rectangle, said w is a width of said rectangle, and said h is a height of said rectangle.

20. The apparatus of claim 18, wherein said program further includes the step of providing at least one external input representing a dimension of said polygon.

21. A method for identifying at least one discrete moving object within a series of video images, said method comprising:
  storing a time series of video images in an image recording device;
  identifying a plurality of feature point tracks in said time series of video images, wherein for each video image of said time series of video images, all feature points belonging to a same feature point track are located within a polygon of a predefined size;
  calculating a trajectory similarity factor for each pair of feature point tracks in said plurality of feature point tracks, wherein each trajectory similarity factor is a measure of a maximum distance between a pair of feature point tracks;
  generating a trajectory similarity matrix S, wherein said trajectory similarity matrix S is a Z×Z matrix and Z is a total number of feature point tracks in said time series of video images, and wherein each element $S_{i,j}$ in an i-th row and a j-th column in said trajectory similarity matrix S is given by $S(i,j)$ that represents a trajectory similarity factor between an i-th feature point track and a j-th feature point track for all combinations of values for i and j; and
  identifying at least one discrete moving object in said time series of video images based on said trajectory similarity factors.

22. The method of claim 21, further comprising generating at least one motion region from said plurality of feature point tracks, wherein each of said at least one motion region is a three-dimensional volume in a space formed by a two dimensional coordinate in said time series of video images and an index in a time dimension, and each of said at least one motion region includes at least one of said plurality of feature point tracks.

23. The method of claim 22, further comprising generating at least one coherent motion region from each of said at least one motion region, wherein each pair of feature point tracks in each of said at least one coherent motion region has a trajectory similarity factor that exceeds a predetermined threshold value.

24. The method of claim 23, wherein each trajectory similarity factor between a pair of a feature point track in a coherent motion region and another feature point track not belonging to said coherent motion region has a value that does not exceed said predetermined threshold value.

25. The method of claim 21, wherein said $S(i,j)$ is given by the formula, $S(i,j)=\exp[-\alpha \times DQ(i,j)-\beta \times DVQ(i,j))]$, wherein $\alpha$ and $\beta$ are quantity representing a first statistical quantity of a set of non-linear parameters derived from distances between said i-th feature point track and said j-th feature point track in said time series of video images, and $DVQ(i,j)$ is a second statistical quantity of said set of non-linear parameters for all combination of values for i and j.

26. The method of claim 21, further comprising generating a Z×M matrix A, wherein Z is a total number of feature point tracks in said time series of video images, M is a total number of motion regions in said time series of video images, and an element of A in a k-th row and an l-th column is set at 1 only if a k-th feature point track is present in an l-th motion region in at least one of said time series of video images, and is set at 0 if not, and , wherein each of said at least one motion region is a three-dimensional volume in a space formed by a two dimensional coordinate in said time series of video images and a time dimension, and each of said at least one motion region includes at least one of said plurality of feature point tracks.

27. The method of claim 26, further comprising:
    detecting whether a previously undetected motion region is present in each of said time series of video images; and
    if a previously undetected motion region is detected, adding to a Z×m matrix A' a column vector representing presence or absence of each feature point track in said time series of video images to form a Z×(m+1) matrix A", wherein m is a positive integer less than M and said Z×m matrix A' has m columns representing presence or absence of each feature point track in said time series of video images in each of previously detected motion regions.

28. The method of claim 27, further comprising modifying at least one preexisting column of said Z×m matrix A' to reflect detection of an additional feature point track in one of previously detected motion regions corresponding to said at least one preexisting column.

29. The method of claim 27, further comprising repeating said steps of detecting and adding until all video images in said time series of video images are examined, wherein said (m +1) becomes equal to M upon a last execution of said adding step during said examining.

30. The method of claim 26, further comprising calculating a coherency strength coefficient L(p) for all value of p, wherein p is an integer from 1 to M and said coherency strength coefficient L(p) is a measure of a likelihood that a p-th motion region represents movement of a single object.

31. The method of claim 30, wherein said coherency strength coefficient L(p) is given by $L(p)=A^T(p)SA(p)$, wherein A(p) is a column vector that is identical to a p-th column of said Z×M matrix A, S is said trajectory similarity matrix, and $A^T(p)$ is a p-th row of a transpose of said Z×M matrix A.

32. The method of claim 31, further comprising determining whether each of said coherency strength coefficient L(p) exceeds a minimum value.

33. The method of claim 32, further comprising generating a set of at least one coherent motion region, wherein each of said at least one coherent motion region has a coherency strength coefficient that exceeds said minimum value, and each motion region that does not belong to said set of at least one coherent motion region has a coherency strength coefficient that does not exceed said minimum value.

34. The method of claim 21, further comprising generating said time series of video images by continuously capturing video images in real time.

35. The method of claim 21, wherein said image analysis device includes a processor in a computer and said image recording device is embedded in said computer or externally connected to said computer and said identifying of said at least one discrete moving object is effected by executing a program of machine-executable instructions.

36. A method for identifying at least one discrete moving object within a series of video images, said method comprising:
    storing a time series of video images in an image recording device;
    identifying a plurality of feature point tracks in said time series of video images, wherein for each video image of said time series of video images, all feature points belonging to a same feature point track are located within a polygon of a predefined size;
    calculating a trajectory similarity factor for each pair of feature point tracks in said plurality of feature point tracks, wherein each trajectory similarity factor is a measure of a maximum distance between a pair of feature point tracks;
    identifying at least one discrete moving object in said time series of video images based on said trajectory similarity factors,
    wherein a trajectory similarity factor between an i-th feature point track and a j-th feature point track is given by the formula, $S(i,j)=\exp[-\alpha \times DQ(i,j)-\beta \times DVQ(i,j)]$, wherein $S(i,j)$ is said trajectory similarity factor between said i-th feature point track and said j-th feature point track, $\alpha$ and $\beta$ are positive constants, $DQ(i,j)$ is a quantity representing a first statistical quantity of a set of non-linear parameters derived from distances between said i-th feature point track and said j-th feature point track in said time series of video images, and $DVQ(i,j)$ is a second statistical quantity of said set of non-linear parameters for all combination of values for i and j.

37. The method of claim 36, wherein said distances are measured distances between pixels of said i-th feature point track and said j-th feature point track in said time series of video images, wherein said first statistical quantity is a maximum, and wherein said second statistical quantity is a standard deviation.

38. The method of claim 37, wherein said non-linear parameters consists of a set of $D_t(i,j)$, wherein $D_t(i,j)=\sqrt{[d_t^x(i,j)]^2+[d_t^y(i,j)]^2}$, $$d_t^x(i,j) = (x_t^i - x_t^j)\left(1 + \max\left(0, \frac{|x_t^i - x_t^j| - w}{w}\right)\right), \text{ and}$$

$$d_t^y(i,j) = (y_t^i - y_t^j)\left(1 + \max\left(0, \frac{|y_t^i - y_t^j| - h}{h}\right)\right),$$

and wherein t is an index selected from a set of indices that encompass all video images that include said i-th feature point track and said j-th feature point track in said time series of video images, $x_t^i$ is an x-coordinate of a point in said i-th feature point track within a video image having an index of t, $x_t^j$ is an x-coordinate of a point in said j-th feature point track within a video image having an index of t, $y_t^i$ is a y-coordinate of a point in said i-th feature point track within a video image having an index of t, $y_t^j$ is a y-coordinate of a point in said j-th feature point track within a video image having an index of t, w is a dimension of said polygon along an x-direction in said video image having an index of t, and h is a dimension of said polygon along a y-direction in said video image having an index of t.

39. The method of claim 38, wherein said polygon is a rectangle, said w is a width of said rectangle, and said h is a height of said rectangle.

40. The method of claim 38, further comprising setting a value for each of at least one dimension of said polygon prior to calculating values for said set of $D_t(i,j)$.

41. A machine-readable data storage device embodying a program of machine-executable instructions to identify at least one discrete moving object, wherein said program includes the steps of:
    identifying a plurality of feature point tracks in said time series of video images, wherein for each video image of said time series of video images, all feature points belonging to a same feature point track are located within a polygon of a predefined size;

calculating a trajectory similarity factor for each pair of feature point tracks said plurality of feature point tracks, wherein each trajectory similarity factor is a measure of a maximum distance between a pair of feature point tracks;

generating a trajectory similarity matrix S, wherein said trajectory similarity matrix S is a Z×Z matrix and Z is a total number of feature point tracks in said time series of video images, and wherein each element $S_{i,j}$ in an i-th row and a j-th column in said trajectory similarity matrix S is given by S(i,j) that represents a trajectory similarity factor between an i-th feature point track and a j-th feature point track for all combinations of values for i and j; and identifying at least one discrete moving object in said time series of video images based on said trajectory similarity factors.

42. The machine-readable data storage device of claim 41, wherein said program further includes the step of generating at least one motion region from said plurality of feature point tracks, wherein each of said at least one motion region is a three-dimensional volume in a space formed by a two dimensional coordinate in said time series of video images and an index in a time dimension, and each of said at least one motion region includes at least one of said plurality of feature point tracks.

43. The machine-readable data storage device of claim 42, wherein said program further includes the step of generating at least one coherent motion region from each of said at least one motion region, wherein each pair of feature point tracks in each of said at least one coherent motion region has a trajectory similarity factor that exceeds a predetermined threshold value.

44. The machine-readable data storage device of claim 43, wherein each trajectory similarity factor between a pair of a feature point track in a coherent motion region and another feature point track not belonging to said coherent motion region has a value that does not exceed said predetermined threshold value.

45. The machine-readable data storage device of claim 41, wherein said S(ij) is given by the formula, S(ij)=exp [α×DQ (i,j)−β×DVQ(i,j))], wherein α and α are positive constants, DQ(i,j) is a quantity representing a first statistical quantity of a set of non-linear parameters derived from distances between said i-th feature point track and said j-th feature point track in said time series of video images, and DVQ(i,j) is a second statistical quantity of said set of non-linear parameters for all combination of values for i and j.

46. The machine-readable data storage device of claim 41, wherein said program further includes the step of generating a Z×M matrix A, wherein Z is a total number of feature point tracks in said time series of video images, M is a total number of motion regions in said time series of video images, and an element of A in a k-th row and an l-th column is set at 1 only if a k-th feature point track is present in an l-th motion region in at least one of said time series of video images, and is set at 0 if not, and, wherein each of said at least one motion region is a three-dimensional volume in a space formed by a two dimensional coordinate in said time series of video images and a time dimension, and each of said at least one motion region includes at least one of said plurality of feature point tracks.

47. The machine-readable data storage device of claim 46, wherein said program further includes the steps of:

detecting whether a previously undetected motion region is present in each of said time series of video images; and if a previously undetected motion region is detected, adding to a Z×m matrix A' a column vector representing presence or absence of each feature point track in said time series of video images to form a Z×(m +1) matrix A", wherein m is a positive integer less than M and said Z×m matrix A' has m columns representing presence or absence of each feature point track in said time series of video images in each of previously detected motion regions.

48. The machine-readable data storage device of claim 47, wherein said program further include the step of modifying at least one preexisting column of said Z×m matrix A' to reflect detection of an additional feature point track in one of previously detected motion regions corresponding to said at least one preexisting column.

49. The machine-readable data storage device of claim 46, wherein said program further includes the step of calculating a coherency strength coefficient L(p) for all value of p, wherein p is an integer from 1 to M and said coherency strength coefficient L(p) is a measure of a likelihood that a p-th motion region represents movement of a single object.

50. The machine-readable data storage device of claim 49, wherein said coherency strength coefficient L(p) is given by $L(p) =_A T (p)SA(p)$, wherein A(p) is a column vector that is identical to a p-th column of said Z×M matrix A, S is said trajectory similarity matrix, and $A^t (p)$ is a p-th row of a transpose of said Z×M matrix A.

51. A machine-readable data storage device embodying a program of machine-executable instructions to identify at least one discrete moving object, wherein said program includes the steps of:

identifying a plurality of feature point tracks in said time series of video images, wherein for each video image of said time series of video images, all feature points belonging to a same feature point track are located within a polygon of a predefined size;

calculating a trajectory similarity factor for each pair of feature point tracks said plurality of feature point tracks, wherein each trajectory similarity factor is a measure of a maximum distance between a pair of feature point tracks;

identifying at least one discrete moving object in said time series of video images based on said trajectory similarity factors, wherein a trajectory similarity factor between an i-th feature point track and a j-th feature point track is given by the formula, S(i,j)=exp [−α×DQ(i,j) −β×DVQ (i,j)) ], wherein S(i,j) is said trajectory similarity factor between said i-th feature point track and said j-th feature point track, α and β are positive constants, DQ(i,j) is a quantity representing a first statistical quantity of a set of non-linear parameters derived from distances between said i-th feature point track and said j-th feature point track in said time series of video images, and DVQ(i,j) is a second statistical quantity of said set of non-linear parameters for all combination of values for i and j.

52. The machine-readable data storage device of claim 51, wherein said distances are measured distances between pixels of said i-th feature point track and said j-th feature point track in said time series of video images, wherein said first statistical quantity is a maximum, and wherein said second statistical quantity is a standard deviation.

* * * * *